Feb. 21, 1956  M. S. COBEN  2,735,979
ELECTRICAL TEST LOADING TRANSFORMER
Filed Feb. 24, 1953
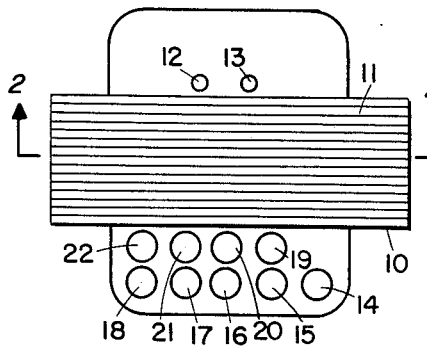
FIG. 1
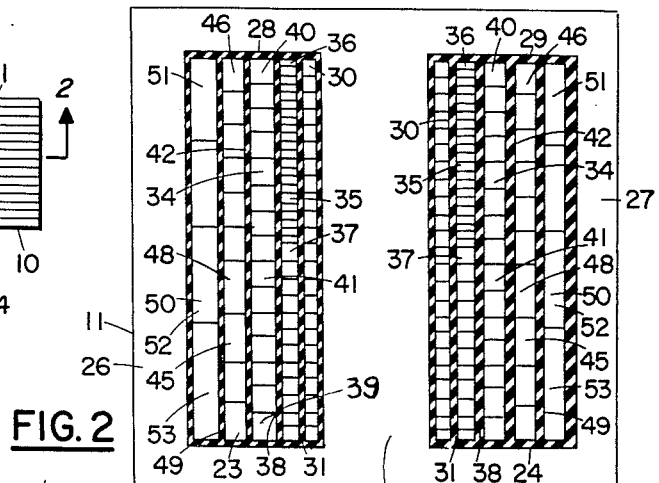
FIG. 2
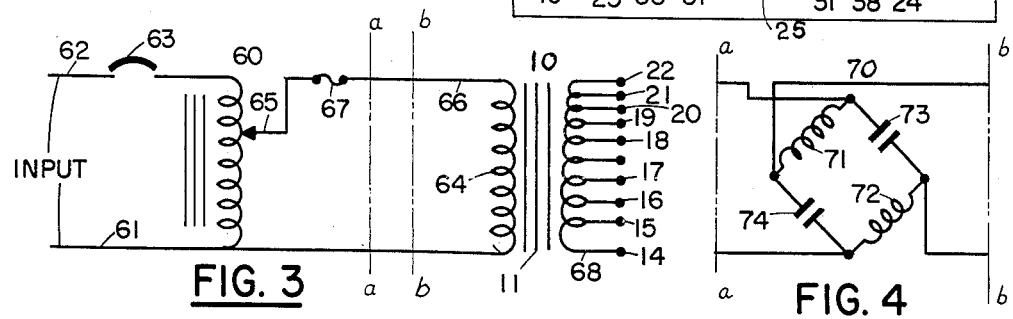
FIG. 3   FIG. 4
FIG. 5
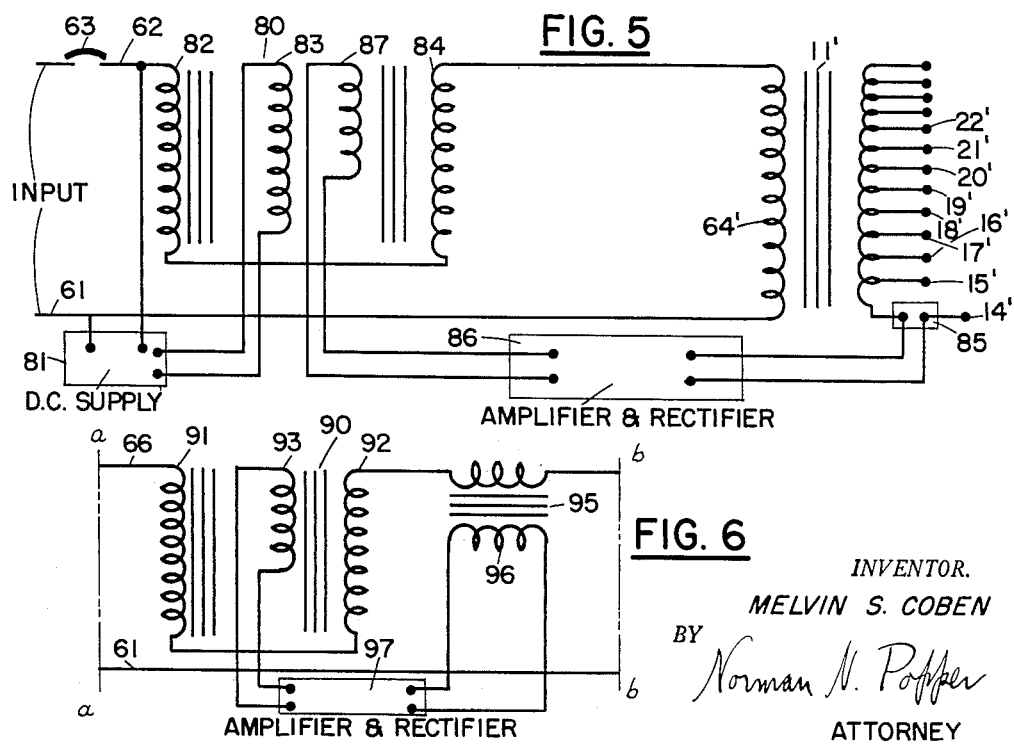
FIG. 6
INVENTOR.
MELVIN S. COBEN
BY
Norman N. Popper
ATTORNEY

United States Patent Office 2,735,979
Patented Feb. 21, 1956

2,735,979

ELECTRICAL TEST LOADING TRANSFORMER

Melvin S. Cohen, Newark, N. J., assignor to Multi-Amp Corporation, a corporation of New Jersey Application February 24, 1953, Serial No. 338,481

7 Claims. (Cl. 323—2)

The present invention relates to electrical test loading equipment. It is particularly directed to equipment for testing and calibrating current actuated electrical devices, such as ammeters, fuses, circuit breakers, and like devices which function in response to an electric current flowing therethrough.

It is a principal object of the present invention to provide an electrical test loading device which is highly efficient in operation, drawing a negligible amount of power in addition to that delivered to the device being tested, and which effects substantial reductions in weight and size over similar test loading devices of the prior art.

It is another object of the present invention to provide an electrical test loading device which is accurately adjustable to deliver any selected amperage, from zero to maximum rated current, at any selected voltage up to the full volt-ampere rating of the device.

It is still another object of the present invention to provide an electrical test loading device which will not distort the wave form of the current flowing through it, and which may be combined with suitable rectifying means for testing direct current actuated devices.

It is a further object of the present invention to provide an electrical test loading device which will automatically maintain a constant output amperage regardless of load impedance variations, over a wide range, and which can be adjusted to deliver a predetermined output amperage before the load is applied.

It is still a further object of the present invention to provide an electrical test loading device which is compact, portable and durable, which accomplishes its intended objects, and which can be manufactured and sold at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Figure 1 is a top plan view of a step transformer constructed in accordance with the present invention.

Fig. 2 is a sectional view taken on the line 2—2 of Fig. 1.

Fig. 3 is a schematic representation of a test loading device constructed in accordance with the present invention.

Fig. 4 is a schematic representation of a current regulating circuit adapted to be interposed between the lines a—a and b—b of Fig. 3 to effect a slightly modified form of the present invention.

Fig. 5 is a schematic representation of another slightly modified form of the present invention.

Fig. 6 is a schematic representation of another current regulating circuit adapted to be interposed between the lines a—a and b—b of Fig. 3 to effect another slightly modified form of the present invention.

Referring now more particularly to the drawings, 10 designates generally a step transformer including a core 11, preferably laminated of magnetically permeable material. Exteriorly of the step transformer 10 are provided a pair of primary input terminals 12 and 13, an output common terminal 14, and a plurality of output secondary taps 15, 16, 17, 18, 19, 20, 21 and 22.

The core 11 is formed with a pair of parallel spaced through slots 23 and 24 forming therebetween a central leg 25 and outer legs 26 and 27. The slots 23 and 24 are lined with insulating material 28 and 29 extending along the edges of the slots.

A coil of magnet wire 30 is circumposed about the central leg 25, extending through the slots 23 and 24 and spaced from the central leg by the insulation 28 and 29. The magnet wire 30 may be of any suitable cross section, preferably constant throughout its length, and forms a primary winding having its ends connected to the primary terminals 12 and 13. A layer of insulating material 31 is circumposed or wrapped about the primary winding 30, and a first or inner coil 35 of the secondary winding, commencing at turn 36, is spirally wound about the central leg 25 adjacent the insulation layer 31. Approximately midway along the leg 25, the magnet wire of coil 35 is increased in cross section, as at turn 37.

Applied about the coil 35 is another layer of insulation 38, upon which is wound the next coil 39 of the secondary winding, coil 39 being connected in series with the coil 35. The coil 39 is fabricated of magnet wire having still larger cross sectional area, commencing at turn 40 and merging with magnet wire of still greater cross sectional area at turn 41. Another layer of insulation 42 is applied about the coil 39, and the next adjacent coil 45 of the secondary winding is connected in series with the coil 39 and wound about the central leg 25 adjacent to the insulation layer 42. The coil 45, being fabricated of magnet wire having greater cross sectional area than that of the coil 39, commences at turn 46 and merges with magnet wire of still greater cross sectional area at turn 48. Circumposed about coil 45 is a layer of insulation 49, upon which is wound final coil 50 of the secondary winding, which coil is connected in series with the preceding coil 45. The coil 50 is fabricated of magnet wire having greater cross sectional area than that of coil 45, commencing at turn 51, merging with magnet wire of still greater cross sectional area at turn 52, and terminating at the final turn of the transformer secondary winding.

For purposes of illustration and clarity of understanding, it may be assumed that the secondary taps are connected to the secondary winding by any suitable means (not shown), common terminal 14 being connected to final turn 53, tap 15 to turn 52, tap 16 to turn 51, tap 17 to turn 48, tap 18 to turn 46, tap 19 to turn 41, tap 20 to turn 40, tap 21 to turn 37, and tap 22 to turn 36. Thus, it is seen that the secondary winding increases in resistance, and conversely, decreases in conductance, by reason of the magnet wire decreasing in cross section, in the direction away from the common terminal 14 or turn 53. A preferred form of the secondary winding would be to start the secondary winding with the heavy copper (common) and gradually reduce the wire cross section as the winding progresses. This form would serve to substantially reduce leakage losses.

Primary 112 turns _____ #14 wire

Secondary

|  | Amp. |
|---|---|
| Tap 22 | 12.5 |
| Tap 21, 55 turns, #14 wire | 25 |
| Tap 20, 15 turns, #10 wire | 33 |
| Tap 19, 14 turns, #8 wire | 50 |
| Tap 18, 12 turns, #6 wire | 100 |
| Tap 17, 8 turns, 2 layers of copper ribbon 1″ x 1/32″ | 250 |
| Tap 16, 3 turns, 4 layers of copper ribbon 1″ x 1/32″ | 500 |
| Tap 15, 1 turn, 7 layers of copper ribbon 1″ x 1/32″ | 1000 |
| Common, 2 turns, 10 layers of copper ribbon 1″ x 1/32″ |  |

Of course, the above specified windings may be varied in accordance with the required volt-ampere output, output current ranges, and regulation requirements. Further, it is appreciated that the windings may be wrapped in any suitable manner, it being only necessary that the turns of the secondary winding link the magnetic flux of the primary winding.

A schematic representation of the test loading device of the present invention is shown in Fig. 3, wherein an autotransformer 60 is connected to the primary of step transformer 10. The autotransformer lines 61 and 62 are adapted for connection to a source of electric power, and a circuit breaker 63, of any suitable construction, is disposed in the line 62. Line 61 extends beyond the autotransformer and is connected to one side of the primary 64 of the step transformer 10, and the variable tap 65 of the autotransformer 60 is connected to the other side of the step transformer primary 64 by line 66. Connected in the line 66 is a fuse 67 of the size required to protect the step transformer 10 and autotransformer 60 from excessive amperage. The step transformer secondary 68 is provided with a common terminal 14 and any desired number of taps 15, 16, 17, 18, 19, 20, 21 and 22, as heretofore described.

In operation, a device to be tested is connected across the common terminal 14 and tap 15, the circuit breaker 63 closed and the autotransformer 60 varied to increase the step transformer input voltage, and consequently output voltage, from zero upwardly. A suitable current reading device will indicate whether or not there is sufficient voltage to overcome the impedance of the device being tested. If the impedance is not overcome, the device being tested will be connected to the common terminal 14 and the next adjacent tap 16, and the autotransformer varied from zero upwardly, as before. This procedure is repeated until the proper test current is provided at the required voltage, which can be accurately adjusted by means of the variable autotransformer. Thus, it is seen that a continuously variable voltage can be applied to a device being tested.

In Fig. 4 is shown a monocyclic square circuit, generally designated 70, wherein the reactance values of the inductances 71 and 72 and capacitances 73 and 74 are equal at the rated frequency, that is, tuned to resonance. As a slightly modified form of the present invention, it is contemplated to interpose monocyclic circuit 70 in the lines 61 and 66 intermediate the dot-dash lines a—a and b—b. By this modification, the output current can be maintained constant regardless of load impedance variation over a wide range.

Another slightly modified form of the present invention is shown in Fig. 5, wherein a saturable reactor, generally designated 80, is interposed in the line 62 in place of the autotransformer 60. The variable D. C. supply 81 feeds coil 83, producing a saturating flux which controls the permeability of the reactor core and the reactance of the device. Thus, a predetermined voltage drop may be effected in the reactor coils 82 and 84, and consequently in the primary 64′ of step transformer 11′. In this manner, the output voltage and current of the step transformer 11′ may be accurately adjusted to a predetermined value. In addition, a shunt or current transformer 85 is inserted in the common terminal 14′ of the step transformer, so that variations in the output current control the variable amplifier and rectifier 86 to produce a direct current in coil 87 and effect correction of the output current. This feed back arrangement of shunt 85, amplifier and rectifier 86, and coil 87 serves to hold the step transformer secondary current constant at a predetermined value regardless of the load impedance.

In operation, the modification illustrated in Fig. 5 is similar to that of Figs. 3 and 4. A device to be test loaded is connected across the common terminal 14′ and secondary tap 15′, and the D. C. supply is varied to produce a voltage from zero to maximum. If there is insufficient output voltage to overcome the impedance of the device being tested, the device is connected to the common terminal and the next adjacent tap 16′ and the D. C. supply again varied to produce a voltage from zero to maximum. This procedure is repeated until at the proper secondary tap the required test current will be provided at the required voltage, and the proper current will be maintained by the feed back arrangement described heretofore.

In Fig. 6 is illustrated another form of current regulating circuit adapted to be interposed in the lines 61 and 66 between the dot-dash lines a—a and b—b of Fig. 3 to effect another slightly modified form of the present invention. Said circuit includes a saturable reactor, generally designated 90, comprising reactor coils 91 and 92 and a D. C. coil 93 to control the reactance of coils 91 and 92. Disposed in the line 66 in front of the step transformer 11 is a current transformer or shunt 95, having its secondary coil 96 connected to the coil 93 through an amplifier and rectifier 97. Thus, any variation in current through line 66 to the step transformer 11 will cause a directly proportional current variation in the secondary coil 96 of the current transformer 95. The current through secondary coil 96 is amplified and rectified and fed back through the coil 93 to control the reactance of coils 91 and 92, whereby an increase or decrease in current through line 66 to the primary coil 64 of step transformer 11, causes an increase or decrease, respectively, in the current through the secondary coil 96 and, hence, through the D. C. coil 93. That is, an increase or decrease in current through line 66 to the step transformer 11, which is directly proportional to the load current in the step transformer secondary 68, effects an increase or decrease, respectively, in the reactance of coils 91 and 92, to thereby maintain the output current constant regardless of load impedance variation over any range within the volt-ampere output rating of the test loading device.

In operation, the modification of Fig. 6 is similar to that of Figs. 3 and 4, and has been found to provide considerably greater control than the heretofore described forms of the invention. A device to be test loaded is connected across the common terminal 14 and a suitable secondary tap, and the variable amplifier and rectifier 97 is adjusted for maximum reactance of the reactor 95. The autotransformer 60 is adjusted to supply the required test current and, when the impedance has increased to maximum, the amplifier and rectifier 97 is adjusted to return the current to its required value. The circuit breaker 63 is then opened and the load allowed sufficient time to reset. Upon closing the circuit breaker 63, the exact required current will be caused to flow through the load, and be maintained constant regardless of the load impedance variation.

From the foregoing, it is seen that the present invention provides a test loading device which is highly efficient in operation, and which requires a minimum of transformer copper to thereby substantially reduce the size and weight of such device with respect to similar devices.

It is further seen that there is provided a test loading device which will accurately deliver any selected amperage at any selected voltage within the kilovolt-ampere rating of the device.

Although the present invention has been described in some detail by way of illustration and example for purposes of clarity and understanding, it is understood that certain changes and modifications may be made within the spirit of the invention and the scope of the appended claims. For instance, while the particular embodiment of the invention herein described pertains to single phase systems, it is fully appreciated that the invention is not so limited, but equally well adapted for use with the various conventional polyphase systems now employed.

What is claimed is:

1. An electrical test loading device comprising variable voltage transforming means adapted for connection to a source of electric power, and a step transformer including a primary winding and a secondary winding, said primary winding being connected to said variable voltage transforming means, said secondary winding decreasing in cross-section from one end toward the other end thereof to provide a constant kilovolt-ampere characteristic between said one end and spaced points therealong, whereby any selected combination of voltage and amperage is available at said secondary winding within a predetermined kilovolt-ampere range, in combination with current regulating means for maintaining a constant current through the step transformer secondary regardless of load over a wide range.

2. An electrical test loading device comprising variable voltage transforming means adapted for connection to a source of electric power, and a step transformer including a primary winding and a secondary winding, said primary winding being connected to said variable voltage transforming means, said secondary winding decreasing in cross-section from one end toward the other end thereof to provide a constant kilovolt-ampere characteristic between said one end and spaced points therealong, whereby any selected combination of voltage and amperage is available at said secondary winding within a predetermined kilovolt-ampere range, in combination with a monocyclic square circuit interposed between said voltage transforming means and said step transformer for maintaining a constant current through the secondary winding of said step transformer over a wide range of load values.

3. An electrical test loading device comprising variable voltage transforming means adapted for connection to a source of electric power, and a step transformer including a primary winding and a secondary winding, said primary winding being connected to said variable voltage transforming means, said secondary winding decreasing in cross-section from one end toward the other end thereof, whereby any selected combination of voltage and amperage is available at said secondary winding within a predetermined kilovolt-ampere range, in combination with current regulating means for maintaining a constant current through the step transforming secondary winding regardless of load over a wide range.

4. In an electrical test loading device, a primary winding adapted for connection to a source of electric power, a secondary winding arranged to link the magnetic flux of the primary winding, said secondary winding varying in current carrying capacity longitudinally therealong, and a plurality of taps spaced along said secondary winding, whereby different voltages and amperages are selectively available from the secondary winding, in combination with a saturable reactor interposed between the power source and primary winding, said saturable reactor including means for selectively varying the reactance of said saturable reactor, to thereby control the amperage in said secondary winding.

5. In an electrical test loading device, a primary winding adapted for connection to a source of electric power, a secondary winding arranged to link the magnetic flux of the primary winding, said secondary winding varying in current carrying capacity longitudinally therealong, and a plurality of taps spaced along said secondary winding, whereby different voltages and amperages are selectively available from the secondary winding, in combination with a saturable reactor interposed between the power source and primary winding, said saturable reactor including means for selectively varying the reactance of said saturable reactor, and a second means for varying the reactance of said saturable reactor in response to amperage variations in said secondary winding, to thereby maintain a constant predetermined amperage in said secondary winding.

6. An electrical test loading device comprising a saturable reactor adapted for connection to a source of electric power, and a step transformer including a primary winding and a secondary winding, said primary winding being connected to said saturable reactor, said secondary winding being of decreasing cross-section from one end toward the other end thereof, whereby any selected combination of voltage and amperage is available at said secondary winding within a predetermined kilovolt-ampere range, wherein said saturable reactor includes means responsive to current variations in the primary winding of said step transformer for varying the reactance of said saturable reactor, to thereby maintain a constant output current through the secondary of said step transformer.

7. An electrical test loading device comprising a saturable reactor adapted for connection to a source of electric power, and a step transformer including a primary winding and a secondary winding, said primary winding being connected to said saturable reactor, said secondary winding being of decreasing cross-section from one end toward the other end thereof, whereby any selected combination of voltage and amperage is available at said secondary winding within a predetermined kilovolt-ampere range, wherein said saturable reactor includes current transformer means responsive to current variations in the primary winding of said step transformer for varying the reactance of said saturable reactor, to thereby maintain a constant output current through the secondary of said step transformer.

References Cited in the file of this patent

UNITED STATES PATENTS

| 1,550,906 | Knopp | Aug. 25, 1925 |
| 2,445,577 | Haug | July 20, 1948 |
| 2,604,519 | Mackereth | July 22, 1952 |

FOREIGN PATENTS

| 496,461 | France | Aug. 4, 1919 |